Jan. 6, 1953 A. L. EWING 2,624,451
PORTABLE FOOD AND BEVERAGE CONTAINER
Filed Aug. 10, 1949
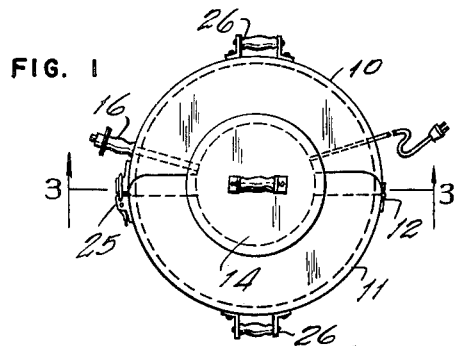
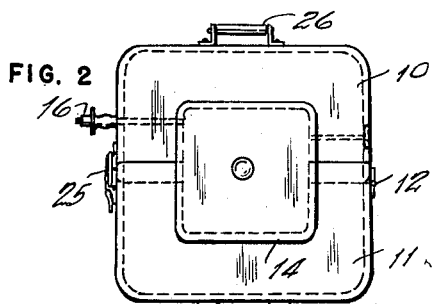
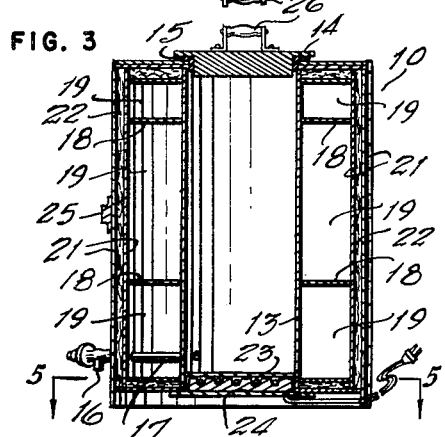
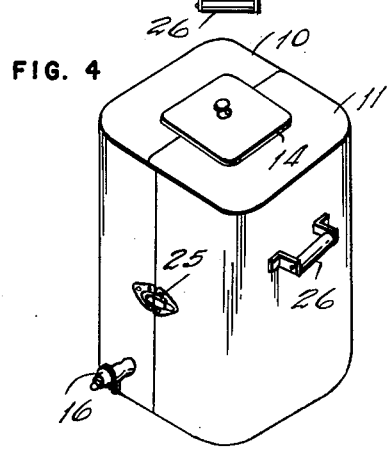
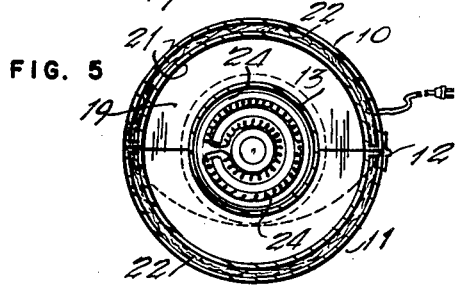
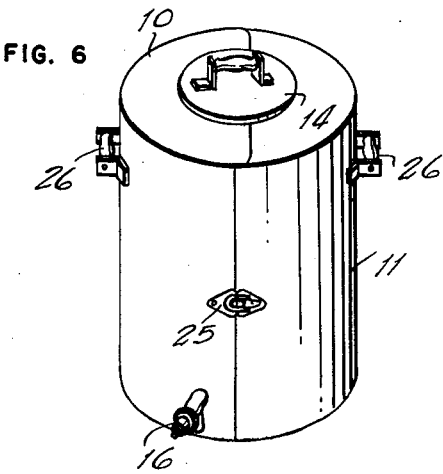
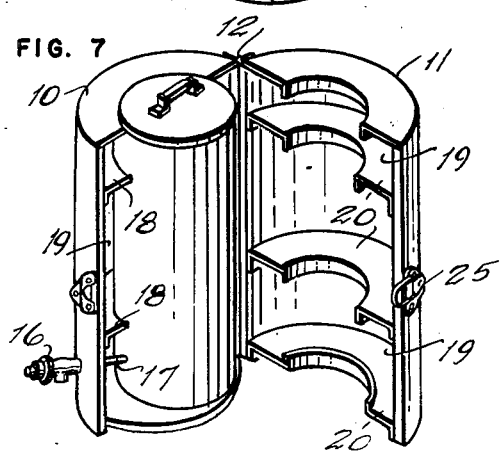
ALBERT L. EWING
INVENTOR.
BY *Cecil L. Wood*
ATTORNEY Patented Jan. 6, 1953

2,624,451

UNITED STATES PATENT OFFICE 2,624,451

PORTABLE FOOD AND BEVERAGE CONTAINER

Albert L. Ewing, Stephenville, Tex., assignor to R. C. Wood, Graham, Tex.

Application August 10, 1949, Serial No. 109,453

2 Claims. (Cl. 206—4)

This invention relates to portable food and beverage containers, of the type wherein such articles may be preserved at suitable temperatures for indefinite periods, and its principal object resides in the provision of a cabinet in which is embodied a liquid container concentrically thereof and capable of containing liquids at relatively high or low temperatures and maintain such temperatures interiorly of the cabinet to preserve articles stored therein in suitable edible condition while yet providing for the dispensing of the liquid contents of said container without opening the cabinet.

Another object of the invention is that of providing a compact and conveniently formed pack, suitably insulated, and formed of a plurality of hingedly associated sections which, when joined, embrace the liquid container and define an annular food storage chamber thereabout and in such relationship thereto as to be cooled or heated by the contents of said container.

Broadly, the invention contemplates the provision of an economical cabinet by which is afforded means whereby foods and beverages can be transported by sportsmen, and the like, or employed by venders for dispensing articles of food and hot or cold beverages.

While the foregoing objects are paramount, other and lesser objects will become manifest as the description proceeds, taken in connection with the appended drawings wherein:

Figure 1 is a plan view of the preferred form of the invention.

Figure 2 is a plan view of a modified form of the invention which is rectangular in transverse section.

Figure 3 is a longitudinal sectional view of the preferred form of the invention, taken on line 3—3 of Figure 1, showing the concentric beverage container.

Figure 4 is a perspective view of the modified form of the invention.

Figure 5 is a transverse sectional view through the bottom of the housing, on line 5—5 of Figure 3, showing the heating element in the bottom of the beverage container.

Figure 6 is a perspective view of the preferred cylindrical form of the invention, and Figure 7 is a perspective view illustrating the cylindrical cabinet in open position.

Accordingly, the invention has a preferably cylindrical housing which is formed with two semi-cylindrical sections 10 and 11 hinged along complementary edges at 12, as shown in Figures 5 and 7. Concentrically of the section 10 is arranged a cylindrical reservoir 13 for beverages. A cover 14 is provided for the reservoir 13 and has a gasket 15 therearound and at the bottom of the reservoir 13 a spigot 16 is connected through the wall of the section 10 by a tube 17.

The reservoir 13 is spaced from the inner curved wall of the section 10 by a plurality of superposed shelves 18 which conform to the contour of the section 10 and define semi-annular compartments 19 in which articles of food can be stored about the reservoir 13.

The opposite section 11 complements the section 10 to form, when the sections are joined, a cylindrical housing. A series of superposed shelves 20, also semi-annular in shape, are arranged in the section 11 and at the same levels as the shelves 18 are positioned in the section 10 so that when the sections are brought together in their closed position the compartments 19 are annular and completely surround the reservoir 13, as shown in Figure 3.

The sections 10 and 11 have double walls 21 spaced by an insulating material 22 to maintain the internal temperatures of the cabinet, including the contents of the reservoir 13 which may be heated by an electrical heating element 23 arranged in an insulated chamber 24 in the bottom of the reservoir 13, as shown in Figures 3 and 5. Iced beverages may also be placed in the reservoir 13, and thus maintain the interior of the cabinet in a refrigerated condition.

Such an arrangement will provide means whereby, when heated articles of food and beverages are desired, the contents of the reservoir 13 and the cabinet can be heated by the heating element 23 and maintained in such heated condition indefinitely after the element 23 is disconnected. Conversely, ice can be stored in the reservoir 13 to refrigerate the annular area therearound within the cabinet.

A suitable latch 25 is provided for locking the sections in closed position, and a pair of handles 26 are arranged on sections 10 and 11 by which the assembly can be conveniently carried.

Obviously, the cabinet may be substantially rectangular in transverse section, as illustrated in Figures 2 and 4, or in other forms, as desired, and modified in other respects without departing from the spirit and intent of the invention or the scope of the appended claims.

What is claimed is:

1. In a portable food and beverage container, in combination, a cylindrical reservoir having a cover, a concentric housing for said reservoir comprising a pair of semi-cylindrical sections hinged along one of their vertical sides, a plurality of horizontally arranged and vertically spaced shelves in each of said sections spacing the said reservoir therefrom and defining a plurality of superposed annular compartments within said housing, the said shelves in one of said housing sections providing a rigid connection between said reservoir and said last named section.

2. In a cabinet for carrying and preserving foods and beverages, in combination with a cylindrical reservoir, a housing concentrically embracing said reservoir and comprising a pair of semi-cylindrical hingedly connected sections, a plurality of semi-annular shelves arranged in spaced superposed relationship in each section, the said shelves in one section providing a rigid connection therefor with said reservoir whereby, when said housing sections are closed, a plurality of superposed annular compartments are defined within said housing about said reservoir.

ALBERT L. EWING.

REFERENCES CITED

The following references are of record in the file of this patent:

UNITED STATES PATENTS

| Number | Name | Date |
|---|---|---|
| 309,137 | Dudley | Dec. 9, 1884 |
| 356,852 | Robinson | Feb. 1, 1887 |
| 770,528 | Kestner | Sept. 20, 1904 |
| 783,506 | Cooke | Feb. 28, 1905 |
| 909,252 | Straub et al. | Jan. 12, 1909 |
| 917,056 | Hallock | Apr. 6, 1909 |
| 924,185 | Olston | June 8, 1909 |
| 1,031,884 | Stilling | July 9, 1912 |
| 1,979,222 | Goodwin | Oct. 30, 1934 |
| 2,303,282 | Kirby | Nov. 24, 1942 |
| 2,435,981 | Rawson | Feb. 17, 1948 |

FOREIGN PATENTS

| Number | Country | Date |
|---|---|---|
| 218,902 | Great Britain | July 17, 1924 |